United States Patent [19]
Nolle et al.

[11] Patent Number: 5,003,145
[45] Date of Patent: Mar. 26, 1991

[54] INDUCTIVELY OPERATED HEATING APPARATUS FOR PLASTIC MATERIALS

[75] Inventors: Eugen Nolle, Sersheim; Hugo-Werner Geschka, Chamerau, both of Fed. Rep. of Germany

[73] Assignee: E. Blum GmbH & Co., Vachingen, Fed. Rep. of Germany

[21] Appl. No.: 451,337

[22] Filed: Dec. 15, 1989

[30] Foreign Application Priority Data

Dec. 15, 1988 [DE] Fed. Rep. of Germany ....... 3842208

[51] Int. Cl.$^5$ .............................................. H05B 6/42
[52] U.S. Cl. ........................... 219/10.491; 219/10.57; 219/10.75; 219/10.79; 336/61
[58] Field of Search ............. 219/10.491, 10.51, 10.57, 219/10.67, 10.75, 10.79; 336/57, 61

[56] References Cited

U.S. PATENT DOCUMENTS

| | | | |
|---|---|---|---|
| 3,028,566 | 4/1962 | Camilli | 336/57 |
| 3,764,767 | 10/1973 | Randolph | 219/10.491 |
| 3,902,146 | 8/1975 | Muralidharan | 336/57 |
| 4,247,736 | 1/1981 | Grigoriev et al. | 219/10.79 |
| 4,317,979 | 3/1982 | Frank et al. | 219/10.491 |
| 4,673,781 | 6/1987 | Nuns et al. | 219/10.491 |
| 4,761,528 | 8/1988 | Caillaut et al. | 219/10.491 |
| 4,856,097 | 8/1989 | Mohr | 219/10.491 |

Primary Examiner—Philip H. Leung
Attorney, Agent, or Firm—Peter K. Kontler

[57] ABSTRACT

An inductively operated apparatus for heating plastic materials in extruders or for other purposes has a heat-transmitting housing with one or more passages for the material or materials to be heated, and an arrangement for heating the housing. The heating arrangement employs a laminated core with two legs which are magnetically coupled to the housing with the interposition of distancing elements of heat insulating material. The core is surrounded by an exciting coil. In order to prevent overheating of the coil, the heating arrangement further comprises at least one barrier which is interposed between the core and the core and is cooled by one or more streams of a gaseous or liquid coolant, such as water. The barrier can be constituted by a flat tube which is convoluted around the core and supports the coil. A second barrier can be placed around the coil so that the latter is received between two barriers. Alternatively, the barrier can employ a vessel which confines the coil, and a fluid-conveying conduit which draws heat from the vessel.

16 Claims, 2 Drawing Sheets

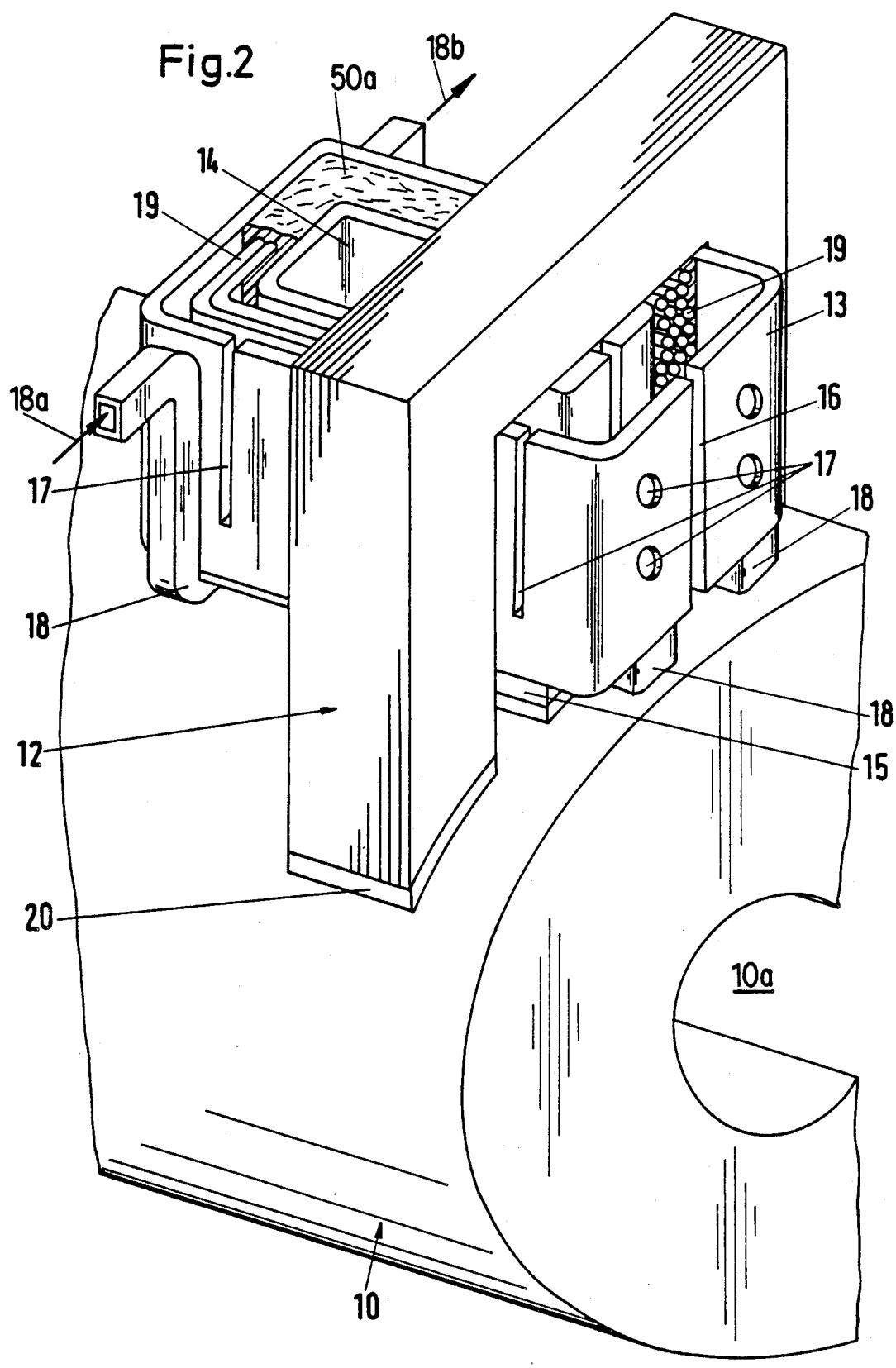

INDUCTIVELY OPERATED HEATING APPARATUS FOR PLASTIC MATERIALS

BACKGROUND OF THE INVENTION

The invention relates to improvements in inductively operated heating apparatus, and more particularly to improvements in apparatus which can be utilized with advantage to heat plastic materials, e.g., to heat granular and/or pulverulent plastic materials in extruders and like machines. Apparatus of the type to which the present invention pertains can be used to heat conveyed particles of plastic material, for example, to form mixtures of different plastic materials or to form new mixtures of certain plastic materials.

An inductively operated heating apparatus of the above outlined character normally comprises a housing which is made of steel so that the magnetic field can establish therein eddy currents which raise the temperature of the housing. The magnetic field is generated by one or more laminated iron cores and one or more exciting coils or windings. Each core has legs which are magnetically coupled to (i.e., they normally abut or are closely adjacent) the housing so that the latter completes the path for magnetic force lines. As a rule, each core resembles the letter E or the letter U.

It is further known to prevent overheating of the exciting coils or windings. In accordance with a known proposal, the coil is hollow to define an internal path for the flow of a coolant.

A drawback of conventional inductively operated heating apparatus of the above outlined character is that they are incapable of heating the housing to an elevated temperature (as a rule, the maximum achievable temperature will be in the range of 200° C.) or that the exciting coil must be operated as a low voltage coil in conjunction with an additional transformer. On the other hand, certain recently developed types of plastic material must be processed at elevated temperatures (ranging up to and even in excess of 500° C.) Conventional exciting coils (which are made of an ideal conductive material, such as copper) are likely to be destroyed at such temperatures, i.e., by heat which is transmitted to the exciting coil or coils by the housing through the medium of the core or cores.

OBJECTS OF THE INVENTION

An object of the invention is to provide an inductively operated heating apparatus wherein the housing or another heat-transmitting unit can be heated to a desired temperature without risking damage to or destruction of the exciting coil or coils Another object of the invention is to provide the apparatus with novel and improved means for preventing overheating of the exciting coil or coils.

A further object of the invention is to provide the apparatus with novel and improved means for cooling the exciting coil or coils.

An additional object of the invention is to provide a simple but highly effective and rugged apparatus which can be used with particular advantage in conjunction with the treatment of plastic materials in extruders and like machines.

Still another object of the invention is to provide an apparatus which can be assembled from a small number of simple parts and wherein the useful life of the exciting coil or coils is longer than in heretofore known apparatus.

A further object of the invention is to provide a novel and improved method of conditioning the exciting coil or coils in the above outlined apparatus.

Another object of the invention is to provide an apparatus which can maintain the heattransmitting unit at a desired temperature, ranging up to and in excess of 500° C., for extended periods of time.

SUMMARY OF THE INVENTION

The invention is embodied in an inductively operated heating apparatus for plastic materials or the like. The improved apparatus comprises a heattransmitting unit (e g., a housing which is made of steel) for the material to be heated, and means for heating the heat-transmitting unit. The heating means comprises at least one laminated core.(e g., an iron core) which is magnetically coupled to the heat-transmitting unit, at least one exciting coil surrounding at least a portion of the at least one core, and at least one fluid-cooled thermally conductive barrier between the at least one core and the at least one coil. The heat-transmitting unit can define one or more passages for the material to be heated, and the at least one coil can be mounted on the barrier.

In accordance with one presently preferred embodiment of the invention, the barrier has a plurality of convolutions between the at least one coil and the at least one core. The convolutions of or the entire barrier can form part of a tube having a preferably polygonal (e g., substantially rectangular) cross-sectional outline.

The apparatus can further comprise a second barrier, and the at least one coil is then disposed between the two barriers. At least one of the barriers can comprise a plurality of hollow fluid-conveying convolutions.

In accordance with another presently preferred embodiment of the invention, the barrier includes a vessel for the at least one coil, and means for cooling the vessel The cooling means can comprise at least one coolant-conveying conduit which exchanges heat with the vessel. The vessel can include means for preventing the development of eddy currents in its material, and such preventing means can have at least one void (e.g., a slot or a circular or otherwise configurated opening or aperture in the vessel).

The at least one core has at least two end portions by way of which it is magnetically coupled to the heat-transmitting unit, and the apparatus can further comprise a body of electrically insulating material (e.g., a hardened insulating compound) which confines the at least one coil, the barrier or barriers and the at least one core with the exception of the end portions.

Still further, the apparatus can be provided with distancing means interposed between the at least one core (such as between the aforementioned end portions of the at least one core) and the heattransmitting unit. The distancing means can be made of, or it can contain, a heat-insulating material, i e., a material of relatively low thermal conductivity in contrast to the material of the barrier or barriers.

The novel features which are considered as characteristic of the invention are set forth in particular in the appended claims. The improved apparatus itself, however, both as to its construction and the mode of operating and assembling the same, together with additional features and advantages thereof, will be best understood upon perusal of the following detailed description of certain presently preferred specific embodiments with reference to the accompanying drawing.

BRIEF DESCRIPTION OF THE DRAWING

FIG. 2 is a fragmentary perspective view of a modified inductively operated heating apparatus.

DESCRIPTION OF PREFERRED EMBODIMENTS

Figure 1:
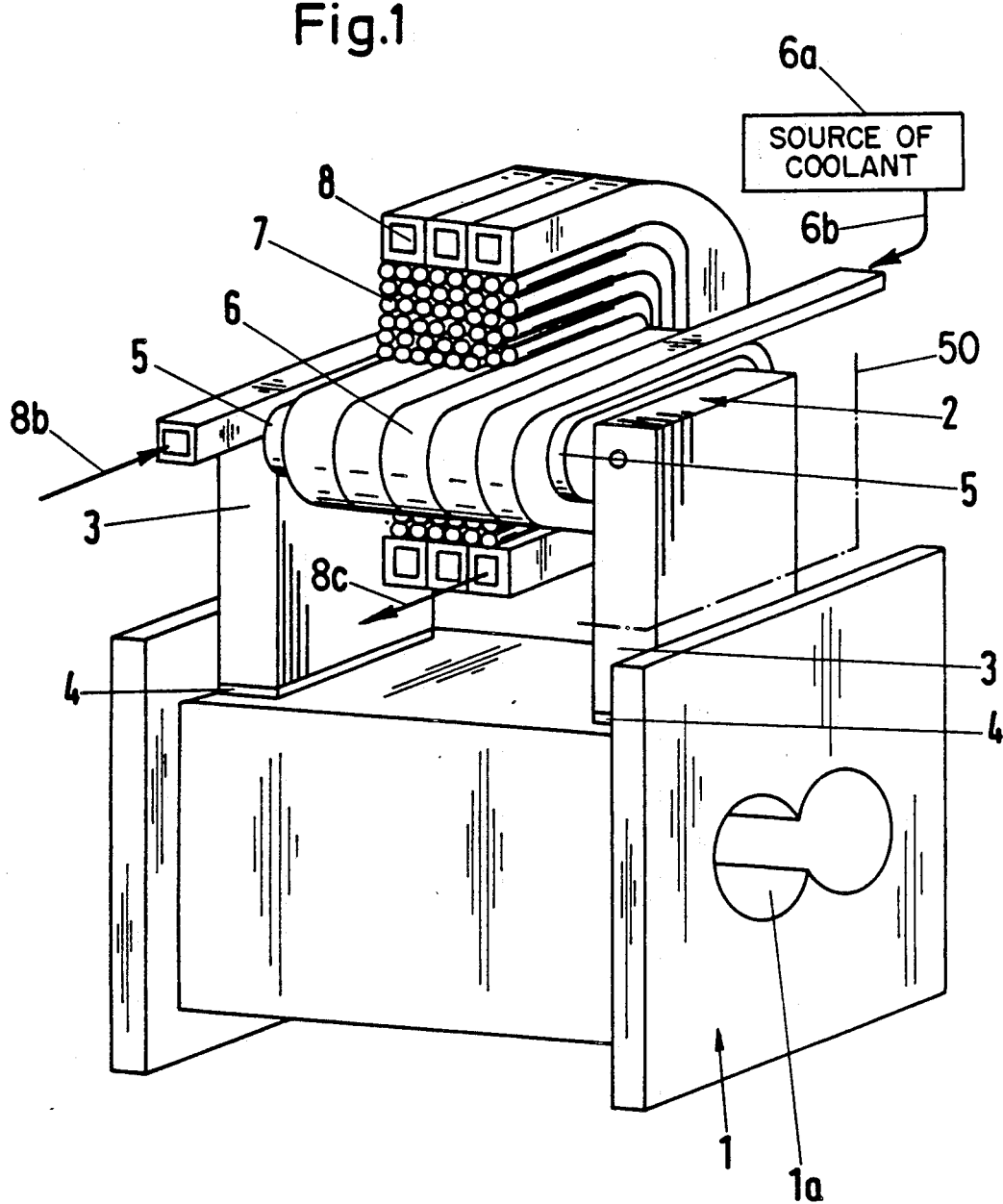
FIG. 1 is is a perspective view of an inductively operated heating apparatus which embodies one form of the present invention.

FIG. 1 shows an inductively operated heating apparatus wherein the block-shaped heattransmitting unit includes or constitutes a housing 1 made of steel or another material which does not interfere with the establishment of magnetic force lines between the two end portions or legs 3 of a substantially U-shaped laminated iron core 2. The web (not shown) of the core 2 between the legs 3 is indirectly surrounded by the windings of an exciting coil 7 which can be made of copper or other suitable electrically conductive material.

The legs 3 of the core 2 constitute or form part of a magnetic coupling between the core and the unit 1; the latter can form part of an extruder or a like machine and its passage 1a establishes a path for the flow of plastic or other material to be heated. The unit 1 can be provided with two or more passages without departing from the spirit of the invention. Each such passage can receive one or more screws or worms of the extruder. Heat-resistant distancing elements 4 are interposed between the legs 3 and the adjacent portions of the unit 1. The distancing elements 4 can be made of a heat-insulating material, i.e., a material which need not be a good conductor of heat.

The web of the core 2 is surrounded by a jacket 5 which is made of a heat resistant material and, in turn, is surrounded by the convolutions of a fluid-cooled barrier 6 having a polygonal (preferably elongated rectangular or nearly rectangular) crosssectional outline. The entire barrier 6 can constitute an elongated tube which defines a path for the circulation of a fluid coolant, e.g., water. The direction of flow of coolant from a source 6a into one end of the tube of the barrier 6 is indicated by an arrow 6b, and spent coolant issues from the other end of the tube.

The convolutions of the barrier 6 support and are surrounded by the windings of the exciting coil 7. The convolutions of the barrier 6 can form a single layer which surrounds the jacket 5 and, in turn, is surrounded by the innermost windings of the coil 7. As is well known in the relevant art, the purpose of the coil 7 is to build up the necessary magnetic field in order to heat the unit 1.

A second barrier 8 is provided around the coil 7, i.e., the latter is disposed between the barriers 6 and 8. The barrier 8 includes an elongated tube having a substantially square crosssectional outline and forming a single layer of convolutions surrounding the outermost convolutions of the coil 7. The direction of flow of a cooling fluid from a source (such as the source 6a) is indicated by an arrow 8b, and the arrow 8c indicates the direction of flow of fluid coolant which leaves the tube of the second barrier 8 The number of convolutions of the barrier 6 can match the number of convolutions of the barrier 8, and the convolutions of the barrier 6 can be wound counter to the direction of winding of the convolutions of the barrier 8 so as to prevent them from conveying transformer voltage induced by the exciting coil 7.

In order to ensure that the parts 2, 6, 7 and 8 of the means for heating the unit 1 will remain in optimum mutual positions when the improved apparatus is assembled, the latter preferably further comprises a body 50 of electrically insulating material (a portion of this body, which can consist of a hardened insulating compound of any known composition, is indicated in FIG. 1 by phantom lines) The body 50 completely confines the barriers 6, 8, the coil 7 and that portion of the core 2 which extends between the legs 3. The body 50 can be confined in a casing (not shown) of heat-resistant material.

An important advantage of the improved apparatus is that overheating of the coil 7 is prevented in a simple, reliable and inexpensive way. The outer barrier 8 is optional. The apparatus can readily heat the preferably solid unit or housing 1 to a required temperature which can reach or even exceed 500° C. so that the passage 1a can be used to convey one or more plastic materials which must be extruded at such elevated temperature It has been found that the efficiency of the improved inductively operated heating apparatus is very satisfactory and that the useful life of the coil 7 is much longer than in heretofore known inductively operated heating apparatus for plastic materials and the like.

At least the barrier 6 is preferably made of a material (e.g., a suitable metal) which is a good conductor of heat The material of the barrier 6 is heated by the adjacent portion of the core 2 and the thus transmitted heat is withdrawn by fluid which is conveyed in the direction of arrow 6b to thus prevent an overheating of the coil 7. The core 2 is heated by the housing or unit 1 but the thus transmitted heat cannot reach (or cannot overheat) the coil 7. Therefore, the coil 7 need not be made of tubular material and need not convey a flow of gaseous or liquid coolant.

FIG. 2 shows a modified inductively operated heating apparatus wherein the heat-transmitting housing or unit 10 includes or constitutes a cylinder having one or more passages 10a for the material to be heated. The laminated core 12 of this apparatus can be made of iron and resembles the letter E with two outer end portions or legs separated from the peripheral surface of the unit 10 by relatively thin distancing elements 20 made of a material which is not or need not be a good conductor of heat. The barrier of the apparatus which is shown in FIG. 2 constitutes a vessel or receptacle 13 for the exciting coil 19. The material of the vessel 13 is a good conductor of heat, and the barrier further comprises a conduit 18 which is connected to and serves to cool the vessel. To this end, the conduit 18 defines a path for the flow of a gaseous or liquid coolant which is admitted from a suitable source (not shown) in the direction of arrow 18a and leaves the conduit in the direction of arrow 18b. The median or central leg 15 of the core 12 extends through the vessel 13 toward the peripheral surface of the unit 10. To this end, the vessel 13 has a central aperture 14 for the leg 15.

The outer wall of the vessel 13 is provided with means for preventing the development of eddy currents in the barrier Such preventing means includes one or more voids. FIG. 2 shows a void in the form of a slot 16 extending substantially radially of the unit 10 and several circular and elongated openings 17. The slot 16 extends all the way from that edge face of the outer wall of the vessel 13 which is adjacent the peripheral surface of the unit 10 to the other or outer edge face of such wall. This prevents the vessel 13 from acting as a short-circuiting winding. The openings 17 serve primarily or additionally to prevent the development of pronounced eddy currents under the action of stray fields.

The conduit 18 has a square or rectangular cross-sectional outline and can serve to convey a flow of liquid coolant, e.g., water. The arrangement is preferably such that the conduit 18 is maintained in pronounced heat-transmitting contact with the adjacent portions of the vessel 13 so that the coolant in the conduit 18 can remove large quantities of heat.

The reference character 50a denotes a body of electrically insulating compound which surrounds the windings of the exciting coil 19 in the vessel 13.

It is to be noted that FIG. 2 shows only a portion of the core 12, i e., this core comprises additional laminations so that the median or central leg 15 at least substantially fills the aperture 14.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An inductively operated heating apparatus for plastic materials and the like, comprising a heat-transmitting housing having at least one passage for the material to be heated; and means for heating said housing including at least one laminated iron core which is magnetically coupled to said housing, said at least one core defining an open magnetic circuit and said circuit being completed by said housing, at least one coil surrounding at least a portion of said at least one core, and at least one fluid-cooled thermally conductive barrier which carries said at least one coil and is disposed between said at least one core and said at least one coil.

2. The apparatus of claim 1, wherein said at least one barrier has a plurality of convolutions between said at least one coil and said at least one core.

3. The apparatus of claim 2, wherein said convolutions form part of a tube having a polygonal cross-sectional outline.

4. The apparatus of claim 3, wherein said tube has a substantially rectangular cross-sectional outline.

5. The apparatus of claim 1, further comprising a second barrier, said at least one coil being disposed between said barriers.

6. The apparatus of claim 5, wherein at least one of said barriers comprises a plurality of convolutions.

7. The apparatus of claim 1, wherein said at least one barrier includes a vessel for said at least one coil and means for cooling said vessel.

8. The apparatus of claim 7, wherein said cooling means comprises at least one coolantconveying conduit which exchanges heat with said vessel.

9. The apparatus of claim 7, wherein said vessel includes means for preventing the development of eddy currents therein.

10. The apparatus of claim 9, wherein said preventing means has at least one void in said vessel.

11. The apparatus of claim 10, wherein said at least one void is a slot.

12. The apparatus of claim 10, wherein said at least one void is an opening.

13. The apparatus of claim 1, wherein said at least one core has two end portions adjacent said housing and further comprising a body of electrically insulating material confining said at least one coil, said at least one barrier and said at least one core save for said end portions.

14. The apparatus of claim 13, wherein said body includes a hardened insulating compound.

15. The apparatus of claim 1, further comprising distancing means interposed between said at least one core and said housing.

16. The apparatus of claim 15, wherein said distancing means consists of or contains a heatinsulating material.

* * * * *